United States Patent
Douzono et al.

(10) Patent No.: US 6,686,549 B2
(45) Date of Patent: Feb. 3, 2004

(54) ILLUMINATED KEYBOARD SWITCH

(75) Inventors: Shigetaka Douzono, Fukui (JP); Yoshiharu Abe, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/081,149

(22) Filed: Feb. 25, 2002

(65) Prior Publication Data

US 2002/0125118 A1 Sep. 12, 2002

(30) Foreign Application Priority Data

Feb. 26, 2001 (JP) ........................................ 2001-049918

(51) Int. Cl.⁷ ................................................ H01H 3/12
(52) U.S. Cl. ........................................ 200/341; 200/344
(58) Field of Search ........................ 200/5 A, 341–344, 200/510–520, 490–491.2, 242, 245, 253; 400/491.1, 491.2, 491, 495, 496, 490

(56) References Cited

U.S. PATENT DOCUMENTS

| | | | |
|---|---|---|---|
| 4,449,024 A | | 5/1984 | Stracener |
| 5,399,821 A | * | 3/1995 | Inagaki et al. ............... 200/341 |
| 5,404,133 A | * | 4/1995 | Moriike et al. ......... 340/815.56 |
| 5,448,520 A | * | 9/1995 | Shimohigashi et al. 365/189.01 |
| 5,590,020 A | * | 12/1996 | Sellers ........................ 361/680 |
| 5,747,756 A | | 5/1998 | Boedecker |
| 5,797,482 A | | 8/1998 | LaPointe et al. |
| 5,871,088 A | * | 2/1999 | Tanabe ....................... 200/514 |
| 5,874,696 A | * | 2/1999 | Hayashi et al. .............. 200/5 A |
| 5,901,837 A | * | 5/1999 | Aimi .......................... 200/344 |
| 6,011,227 A | * | 1/2000 | Yoneyama ................... 200/344 |
| 6,100,478 A | | 8/2000 | LaPointe et al. |
| 6,179,432 B1 | | 1/2001 | Zhang et al. |
| 6,198,060 B1 | | 3/2001 | Yamazaki et al. |
| 6,199,996 B1 | | 3/2001 | Katrinecz, Jr. et al. |
| 6,284,988 B1 | | 9/2001 | Watanabe et al. |
| 6,322,229 B1 | | 11/2001 | Chan et al. |
| 6,375,372 B1 | * | 4/2002 | Tsau .......................... 400/490 |
| 6,448,520 B1 | * | 9/2002 | Inoue ......................... 200/344 |

FOREIGN PATENT DOCUMENTS

| | | | |
|---|---|---|---|
| EP | 1 028 443 | | 8/2000 |
| JP | 09106729 | | 4/1997 |
| JP | 10235313 | * | 3/2000 |
| JP | 1114808 | * | 1/2002 |
| TW | 438035 | | 5/2001 |
| TW | 465777 | | 11/2001 |

* cited by examiner

Primary Examiner—Michael Friedhofer
Assistant Examiner—Lisa N Klaus
(74) Attorney, Agent, or Firm—McDermott, Will & Emery

(57) ABSTRACT

A cup-shaped elastic member 2 forces push button 1 upwardly that has indication part 1A formed thereon. Light transmitting electrode layer 15B, light-emitting layer 15C, and back electrode layer 15E are sequentially formed on light transmitting sheet 15A to form EL element 15, and the EL element is disposed on the upper or lower face of membrane switch 6. This structure can provide an inexpensive illuminated keyboard switch that allows clear illumination of the push button and uses a smaller number of components.

4 Claims, 12 Drawing Sheets

ILLUMINATED KEYBOARD SWITCH

FIELD OF THE INVENTION

The present invention relates to an illuminated keyboard switch that is used as an input device for various types of electronic equipment, such as a personal computer and a word processor.

BACKGROUND OF THE INVENTION

As such electronic equipment as personal computers and word processors has come into widespread use recently, keyboard switches used as input devices for such equipment also have more multiple functions. For example, a keyboard switch that allows illumination of such indication as letters, symbols, pictures on a push button is required so that the push button can be identified even in dark environments.

A conventional illuminated keyboard switch is described with reference to FIGS. 13 to 15.

FIG. 13 is a partially sectional view of a conventional illuminated keyboard switch and FIG. 14 is an exploded perspective view thereof. With reference to these drawings, light-conductive milky white indication part 1A for letters, symbols, pictures and the like is formed on push button 1 of insulating resin by such a method as two-color forming.

Cup-shaped elastic member 2 made of rubber or elastomer forces push button 1 upwardly. Reference numeral 3 shows an upper sheet that has travelling contact 3A on the bottom face of a transparent insulating film. Reference numeral 4 shows a lower sheet that has fixed contact 4A on the upper face of an insulating film in a similar manner. Upper sheet 3 and lower sheet 4 are bonded by spacer 5 having adhesive applied to the top and bottom faces thereof, and travelling contact 3A and fixed contact 4A are opposite to each other with a predetermined gap therebetween to form membrane switch 6.

Reference numerals 7 and 8 show first and second arms made of insulating resin, respectively. Reference numeral 9 shows a baseboard made of a copper sheet or aluminum. For first and second arms 7 and 8, the upper ends thereof engage with the bottom face of push button 1, the intermediate portions thereof intersect and pivotally engage with each other in a substantially X-shape, and each of the bottom ends thereof is pivotally supported by baseboard 9.

Reference numeral 10 shows a dust-proof and waterproof protective sheet. Reference numeral 11 shows a wiring board made of such materials as paper/phenol substrate and glass/epoxy substrate. A plurality of wiring patterns (not shown) are formed on the top and bottom faces of wiring board 11, and light-emitting diode (LED) 12 is mounted in a position in the vicinity of the contacts of membrane switch 6. In this manner, an illuminated keyboard switch is constructed.

With the above-mentioned structure, when the top face of push button 1 is pressed in the state shown in FIG. 13, push button 1 is moved downwardly while guided by first and second arms 7 and 8, and thereby elastic member 2 of which top face is pressed by the bottom face of push button 1 is warped.

Next, as shown in the cross-sectional view of FIG. 15, pressing part 2A on the inner surface of elastic member 2 presses and warps upper sheet 3 of membrane switch 6, and travelling contact 3A on the bottom face of upper sheet 3 comes into contact with fixed contact 4A on lower sheet 4.

When the pressing force exerted to push button 1 is released, elasticity restoring force of elastic member 2 moves push button 1 upwardly and restores the button to the state shown in FIG. 13. In this manner, the contacts of membrane switch 6 are brought into and out of contact by pressing operation of push button 1.

Light from light-emitting diode (LED) 12 mounted on wiring board 11 passes through hole 9A formed through baseboard 9 and illuminates indication part 1A for letters, symbols, pictures and the like on push button 1 from the bottom. Thus, push button 1 can be identified even in dark environments.

However, for the above-mentioned conventional illuminated keyboard switch, push button 1 is illuminated using LED 12, which emits strong light in a particular direction. Therefore, illumination is insufficient when indication part 1A is in a position displaced from the light-emitting direction of LED 12 In addition, in the case of keyboard switches, for example, a large number of push buttons 1 are arranged, and thus the number of LEDs 12 required is the same as that of push buttons. This poses problems: an increase in the number of components to be used, more time taken to mount the LEDs on wiring board 11, and thus expensiveness.

SUMMARY OF THE INVENTION

The present invention addresses such conventional problems and aims to provide an inexpensive illuminated keyboard switch that allows clear illumination of the push button and uses a smaller number of components.

In order to attain the above-mentioned objects, an illuminated keyboard switch in accordance with the present invention includes:

a push button having an indication part for letters, symbols, and pictures formed thereon;

a cup-shaped elastic member disposed under the push button and forcing the push button upwardly;

a membrane switch disposed under the elastic member; and an electro-luminescence (EL) element disposed on the top or bottom face of the membrane switch.

The EL element that is a surface light-emitting allows clear illumination of the push button. The EL element can also illuminate a plurality of push buttons at the same time. The use of the EL element can reduce the number of components to be used and thus provide an inexpensive illuminated keyboard switch.

DETAILED DESCRIPTION OF PREFERRED EMBODIMENTS

Exemplary embodiments of the present invention are hereinafter demonstrated with reference to FIGS. 1 to 12. Elements similar to those in accordance with the conventional technique have the same reference marks, and the detailed descriptions of those elements are omitted.

First Embodiment

Figure 1:
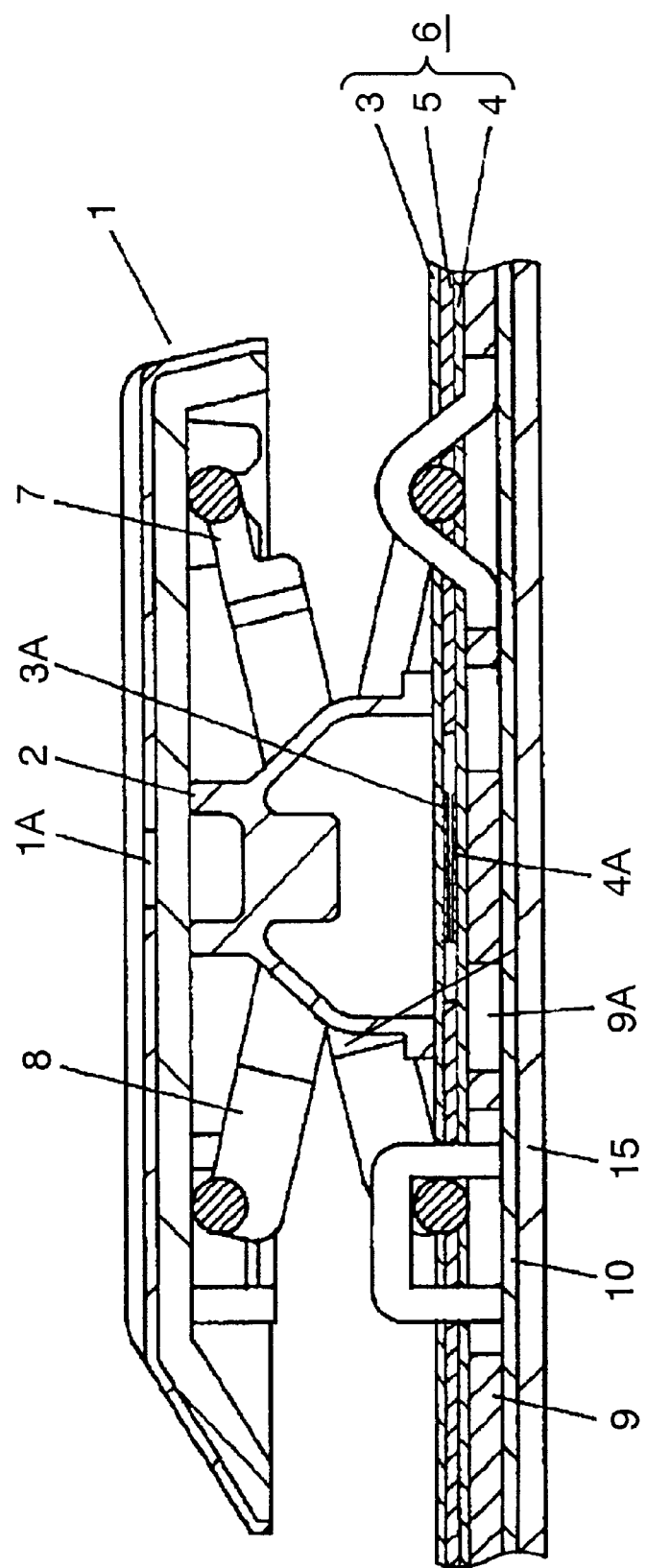
FIG. 1 is a partially sectional view of an illuminated keyboard switch in accordance with a first exemplary embodiment of the present invention.
Figure 2:
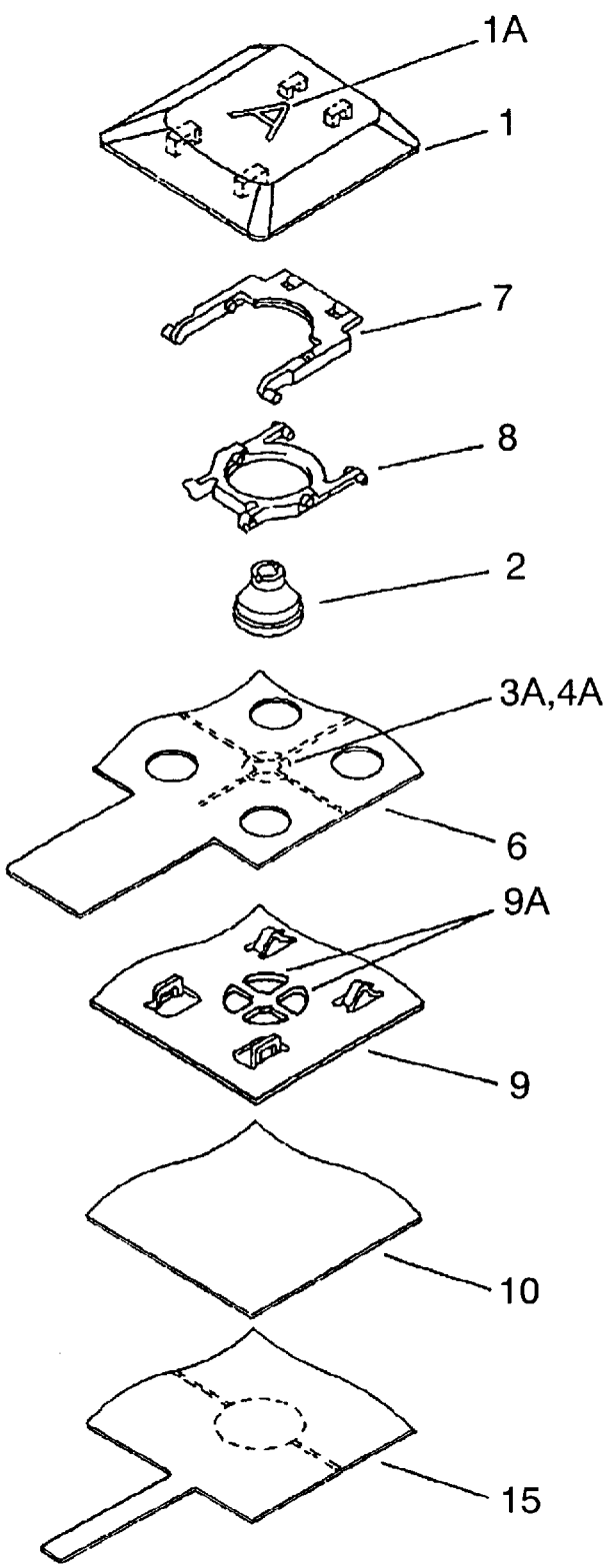
FIG. 2 is an exploded perspective view of the keyboard switch.

FIG. 1 is a partially sectional view of an illuminated keyboard switch in accordance with the first embodiment of the present invention and FIG. 2 is an exploded perspective view thereof. With reference to these drawings, push button 1 made of such insulating resins as ABS, polycarbonate, and acrylic has indication part 1A for letters, symbols, pictures, and the like formed thereon. The indication part is formed by overlaying light-conductive resin having such a color as milky white with lightproof resin using two-color forming, or by laser machining after application of lightproof paint.

Cup-shaped elastic member 2 made of silicon rubber or elastomer forces push button 1 upwardly. Reference numeral 3 shows an upper sheet that has travelling contact 3A made of such materials as silver and carbon on the bottom face of a transparent insulating film made of such materials as polyethylene terephthalate and polyimide. Reference numeral 4 shows a lower sheet that has fixed contact 4A on the upper face of an insulating film in a similar manner. Upper sheet 3 and lower sheet 4 are bonded by spacer 5 having adhesive applied to the top and bottom faces thereof, and travelling contact 3A and fixed contact 4A are opposite to each other with a predetermined gap therebetween to form membrane switch 6.

Reference numerals 7 and 8 show first and second arms, respectively, which are made of such an insulating resin as polyacetal. Reference numeral 9 shows a baseboard made of steel or aluminum. For first and second arms 7 and 8, the upper ends thereof engage with the bottom face of push button 1, the intermediate portions thereof intersect and pivotally engage with each other in a substantially X-shape, and each of the bottom ends thereof is pivotally supported by baseboard 9.

Baseboard 9 has a plurality of through holes 9A provided in an outer peripheral position of the contacts of membrane switch 6. On the bottom face of membrane switch 6, electro-luminescence (EL) element 15 is disposed via dustproof and waterproof film-like transparent protective sheet 10. In this manner, an illuminated keyboard switch is constructed.

Figure 3:
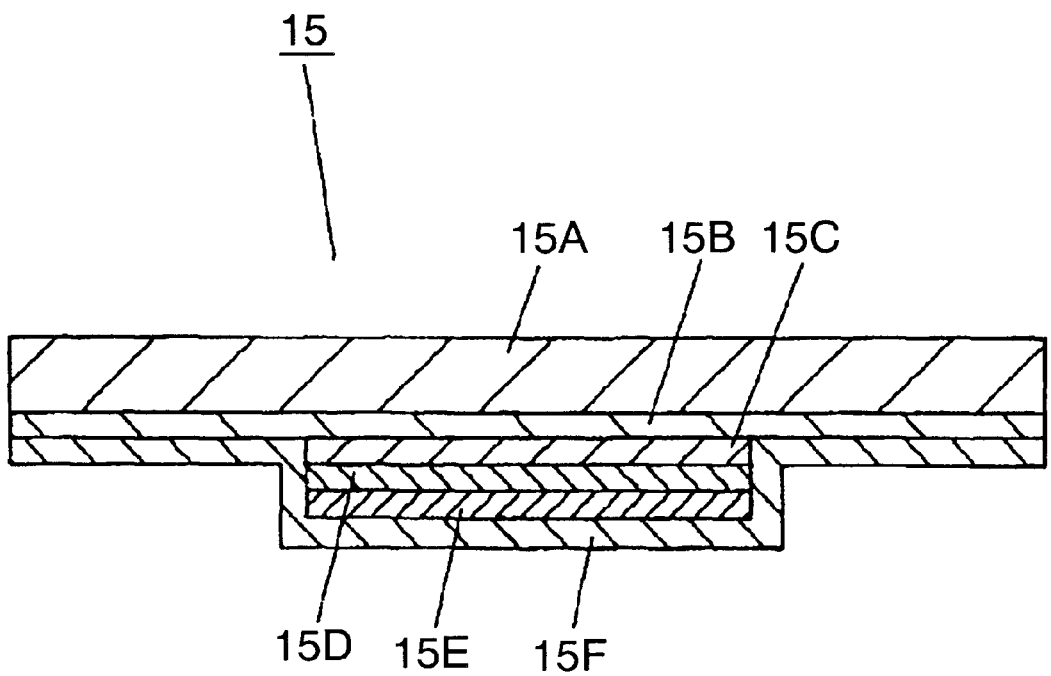
FIG. 3 is a partially sectional view of an EL element for use in the keyboard switch.

FIG. 3 is a partially sectional view of an EL element. With reference to the drawing, reference mark 15A shows a film-like light transmitting sheet made of such materials as polyethylene terephthalate and polyimide. On the bottom face of this light transmitting sheet, light transmitting electrode layer 15B is formed by spattering or electron beam process, or by printing transparent synthetic resin containing such a material as tin indium oxide dispersed therein.

In addition, sequentially printed and overlaid one on another are light-emitting layer 15C that has such materials as fluoro rubber and cyano resin together with such a light-emitting base material as zinc sulfide dispersed therein, dielectric layer 15D that has similar highly dielectric resin together with such a material as barium titanate dispersed therein, back electrode layer 15E that is made of such materials as silver and carbon resin, and insulating layer 15F that is made of such materials as epoxy resin and polyester resin. In this manner, EL element 15 is constructed.

With the above-mentioned structure, when the top face of push button 1 is pressed in the state shown in FIG. 1, push button 1 is moved downwardly while guided by first and second arms 7 and 8, and thereby elastic member 2 of which top face is pressed by the bottom face of push button 1 is warped.

Figure 4:
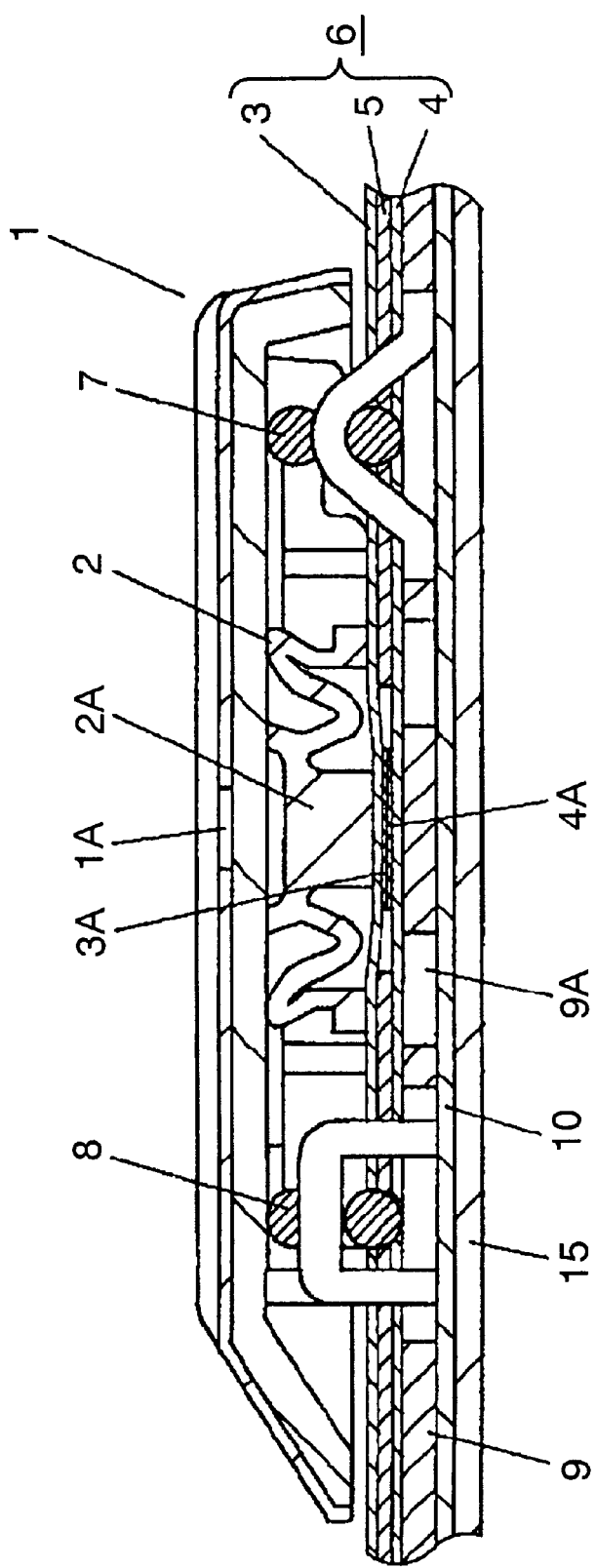
FIG. 4 is a sectional view of the keyboard switch in operation.

Next, as shown in the cross-sectional view of FIG. 4, pressing part 2A on the inner surface of elastic member 2 presses and warps upper sheet 3 of membrane switch 6, and travelling contact 3A on the bottom face of upper sheet 3 comes into contact with fixed contact 4A on lower sheet 4.

When the pressing force exerted to push button 1 is released, elasticity restoring force of elastic member 2 moves push button 1 upwardly and restores the button to the state shown in FIG. 1. In this manner, the contacts of membrane switch 6 are brought into and out of contact by pressing operation of push button 1.

When voltage is applied between light transmitting electrode layer 15B and back electrode layer 15E of EL element 15 that is disposed on the bottom face of membrane switch 6, the whole body of light-emitting layer 15C emits light, and the light passes through holes 9A in baseboard 9 provided in the outer peripheral area of contacts of membrane switch 6 and illuminates push button 1 from the bottom. Therefore, indication part 1A for letters, symbols, pictures, and the like is illuminated and push button 1 can be identified even in dark environments.

In the above description, the structure of one push button 1 is illustrated. However, since a large number of push buttons 1 are arranged in the case of keyboard switches, large sheets having a plurality of contacts and light-emittings respectively are used as membrane switch 6 and EL element 15.

In accordance with the present invention, the use of the EL element that is a surface light-emitting allows clear illumination of the push button. The EL element can also illuminate a plurality of push buttons 1 at the same time. Because the use of the EL element can reduce the number of components to be used, an inexpensive illuminated keyboard switch can be obtained.

Figure 5:
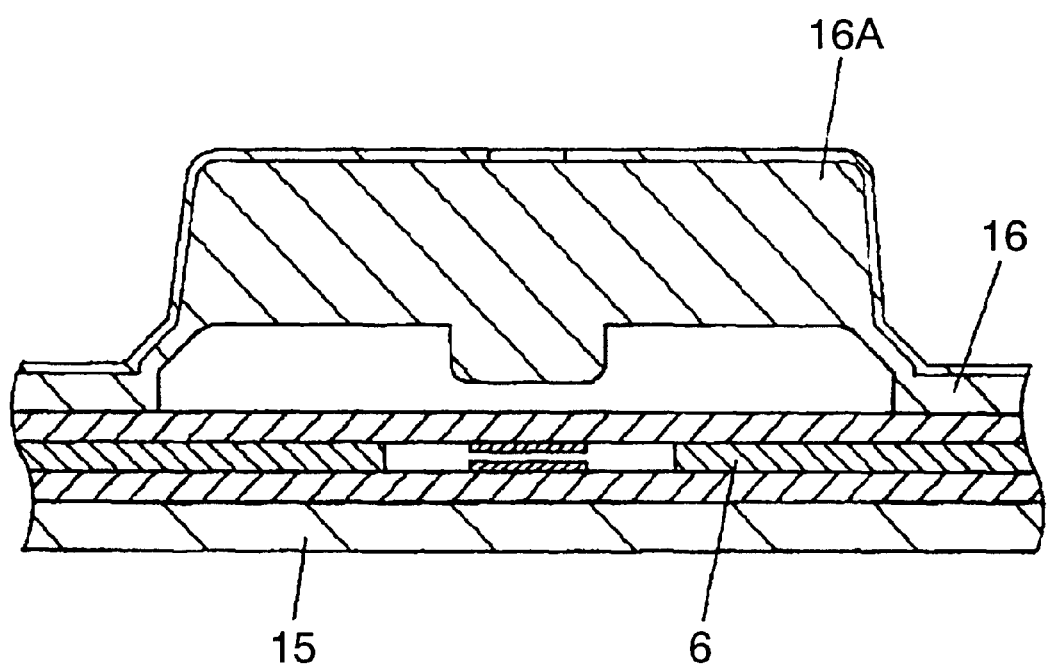
FIG. 5 is a partially sectional view of another example of the keyboard switch.

FIG. 5 shows a partially sectional view of another example of the keyboard switch. Elastic member 16 is made of light-conductive silicon rubber or elastomer having such a color as milky white and is integrally formed with push button 16A. This structure reduces the number of components to be used and can provide a much less expensive illuminated keyboard switch.

Second Embodiment

In the following description, elements similar to those in the above embodiment have the same reference marks, and the detailed descriptions of those elements are omitted.

Figure 6:
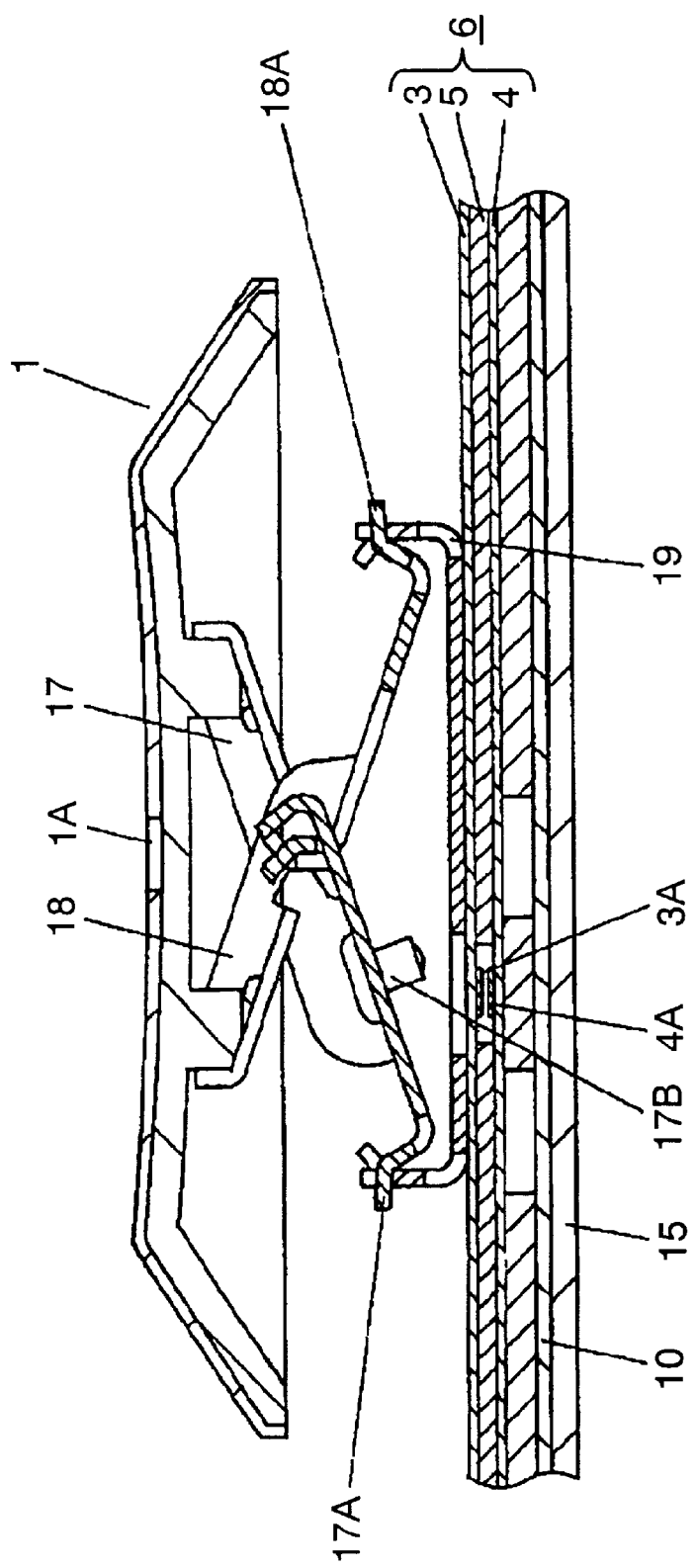
FIG. 6 is a partially sectional view of an illuminated keyboard switch in accordance with a second exemplary embodiment of the present invention.
Figure 7:
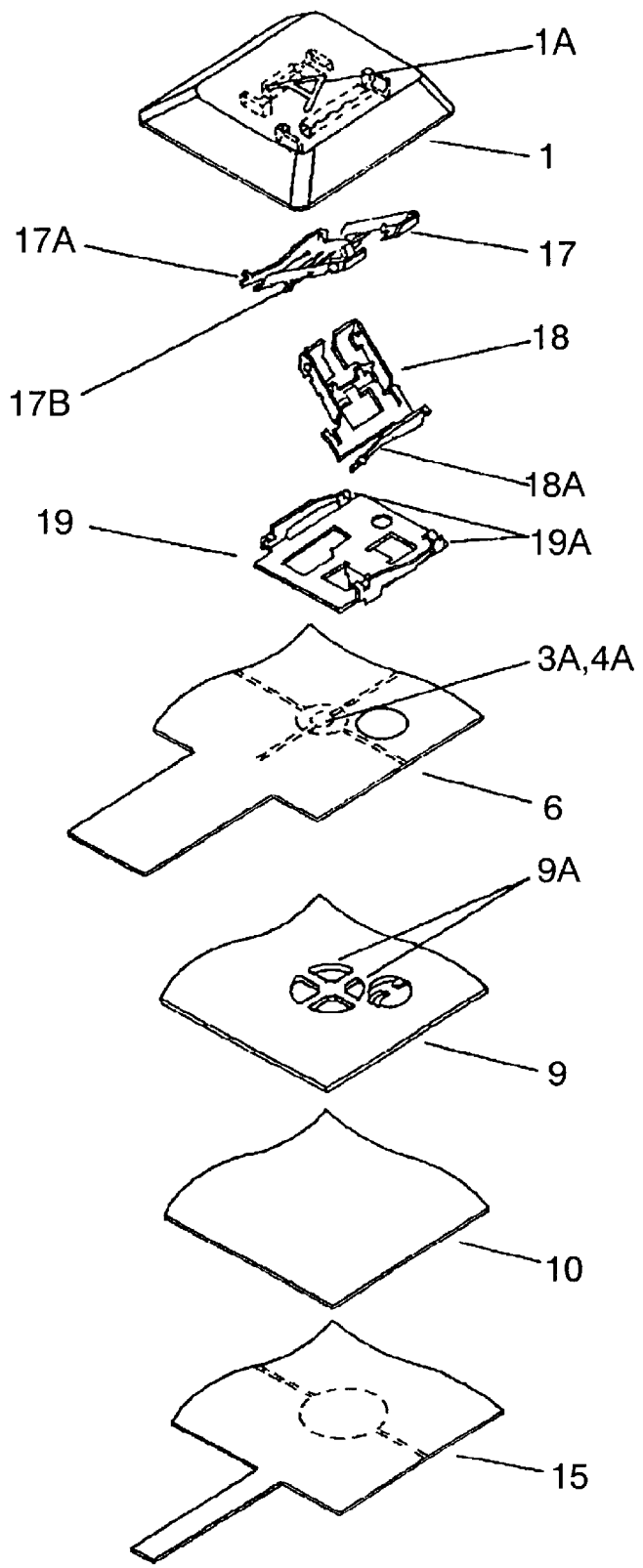
FIG. 7 is an exploded perspective view of the keyboard switch.

FIG. 6 is a partially sectional view of an illuminated keyboard switch in accordance with the second embodiment of the present invention and FIG. 7 is an exploded perspective view thereof. With reference to these drawings, disposed under push button 1 having indication part 1A for letters, symbols, pictures, and the like formed thereon is membrane switch 6 that is made of upper sheet 3 having travelling contact 3A and lower sheet 4 having fixed contact 4A. This structure is identical to that of the keyboard switch in accordance with the first embodiment.

In addition, EL element 15 is disposed on the bottom face of membrane switch 6 via protective sheet 10. This structure is also identical to that of the keyboard switch in accordance with the first embodiment. However, engaged the bottom face of push button on right and left sides thereof is each of the top ends of first resilient frame 17 and second resilient frame 18 that are made of resilient thin metal plates.

For first and second resilient frames 17 and 18, the intermediate portions thereof intersect and pivotally engage with each other in a substantially X-shape. Arm-like springs 17A and 18A formed at each of the bottom ends of the frames are in resilient contact with arm-like bends 19A that are disposed at the right and left ends of base member 19 made of a resilient thin metal plate, and fit the bends. The springs are also pivotally supported by the bends.

First resilient frame 17 also has an arm-like pressing part 17B provided above travelling contact 3A of membrane switch 6. In this manner, an illuminated keyboard switch is constructed.

Figure 8:
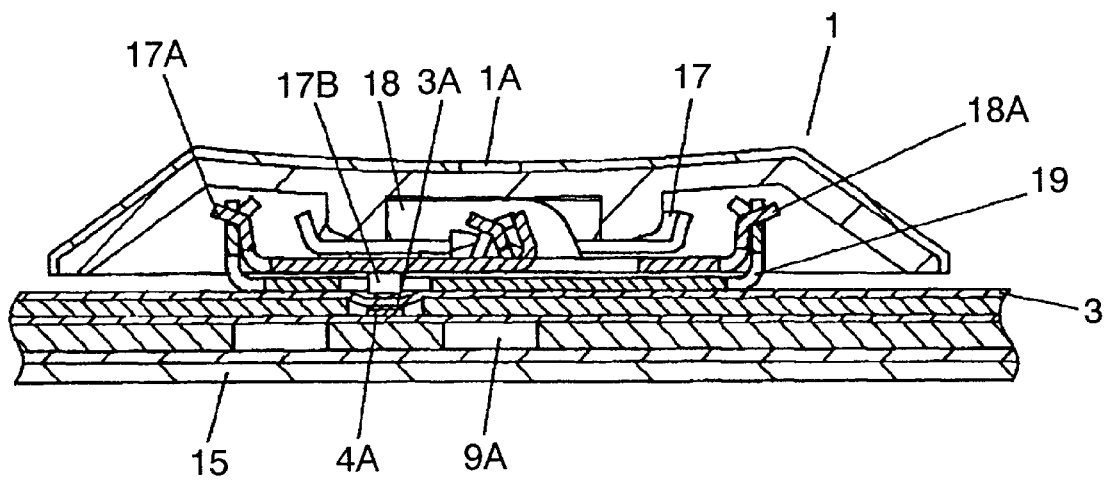
FIG. 8 is a sectional view of the keyboard switch in operation.

With the above-mentioned structure, when the top face of push button 1 is pressed in the state shown in FIG. 6, the intermediate portions of first resilient frame 17 and second resilient frame 18 of which top ends are pressed by the bottom face of push button 1 pivot, and the bottom ends of the resilient frames also pivot while warping springs 17A and 18A and bends 19A of base member 19, as shown in the sectional view of FIG. 8. Thus, push button 1 and the whole body of first and second resilient frames 17 and 18 are moved downwardly.

Next, pressing part 17B on first resilient frame 17 presses and warps upper sheet 3. This brings travelling contact 3A on the bottom face of the sheet into contact with fixed contact 4A, and provides electrical contact of membrane switch 6. When the pressing force is released, resilience restoring force of springs 17A and 18A and bends 19A moves push button 1 and first and second resilient frames 17 and 18 upwardly, and restores the button to the state shown in FIG. 6.

EL element 15 disposed on the bottom face of membrane switch 6 is a surface light-emitting, and the light passes through holes 9A in baseboard 9 provided in the outer peripheral area of contacts of membrane switch 6 and illuminates push button 1 from the bottom. Therefore, indication part 1A for letters, symbols, pictures, and the like is illuminated and push button 1 can be identified even in dark environments.

In this manner, the illuminated keyboard switch in accordance with this embodiment is structured so that the EL element is disposed on the bottom face of membrane switch 6 under first and second resilient frames 17 and 18. The resilient frames have top ends each engaging with the bottom face of push button 1, intermediate portions intersecting and pivotally engaging with each other in a substantially X-shape, and bottom ends pivotally supported by base member 19. This structure can provide an illuminated keyboard switch that allows clear illumination of the push button and uses a smaller number of components.

Figure 9:
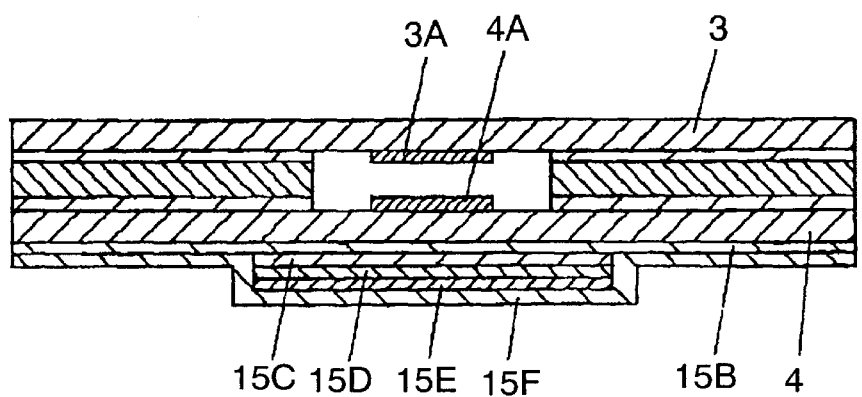
FIG. 9 is a partially sectional view of a membrane switch for use in the keyboard switch.

As shown in the partially sectional view of FIG. 9, light transmitting electrode layer 15B, light-emitting layer 15C, dielectric layer 15D, back electrode layer 15E, and insulating layer 15F can be sequentially overlaid on the bottom face of lower sheet 4 having fixed contact 4A thereon or the top face of upper sheet 3 having travelling contact 3A thereon so as to integrally form the EL element with the membrane switch. This structure can further reduce the number of components to be used.

Figure 10:
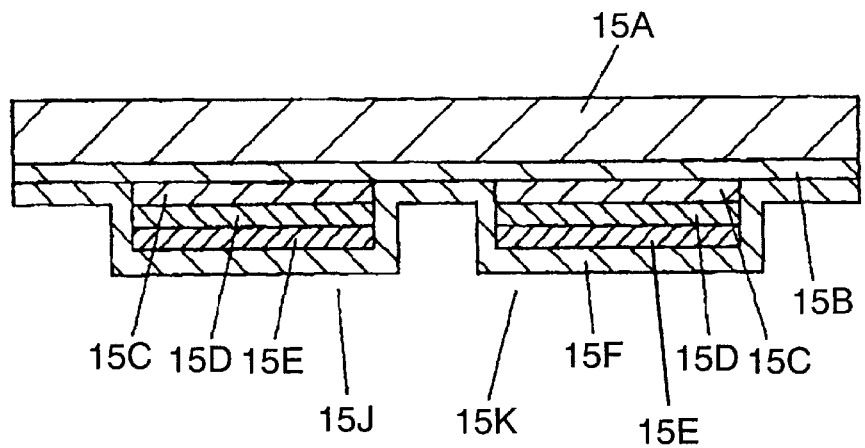
FIG. 10 is a partially sectional view of an EL element for use in the keyboard switch.
Figure 11:
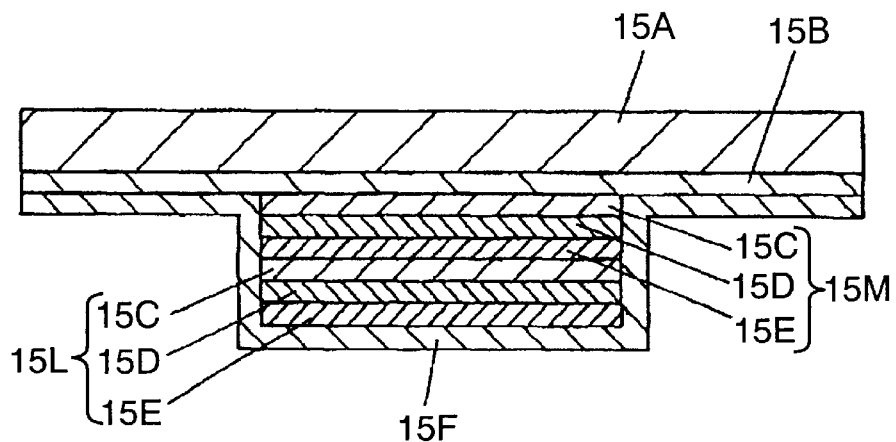
FIG. 11 is a partially sectional view of another example of the EL element for use in the keyboard switch.

Moreover, as shown in the partially sectional view of FIG. 10, after light transmitting electrode layer 15B is formed on light transmitting sheet 15A, a plurality of light-emitting layers 15C, dielectric layers 15D, and back electrode layers 15E can be formed and covered by insulating layer 15F to provide a plurality of illumination parts 15J and 15K in the EL element. This structure allows a various kinds of illumination. For example, when a certain function is given by pressing a shift key, control key, and the like, only push buttons related to the function can light up. Alternatively, a plurality of push buttons can be illuminated in turn according to the procedure of the operation.

Furthermore, a plurality of illumination parts 15J and 15K can have different illumination colors. Alternatively, a plurality of light-emitting layers 15C, dielectric layers 15D and back electrode layers 15E can be overlaid as shown in the partially sectional view of FIG. 11, and illumination parts 15L and 15M each having a different illumination color emit light independently, or emit light at the same time to illuminate the push button using the combination color. This allows illumination using a variety of colors, e.g changing illumination colors according to the functions of push buttons and thus makes the illuminated keyboard switches much easier to use.

In the above description, EL element 15 is structured so as to be disposed on the bottom face of membrane switch 6. However, the present invention can be implemented when structured so that EL element 15 is disposed on the top face of membrane switch 6 and the EL element has a through hole or the like to pass through the pressing part 2A on elastic member 2 or pressing part 17B on first resilient frame 17

Membrane switch 6 is described as a structure that has upper sheet 3 having travelling contact 3A and lower sheet 4 having fixed contact 4A both bonded by spacer 5 having adhesive on the up and bottom faces thereof. However, as shown in the partially sectional view of FIG. 12, the invention can be structured without lower sheet 4. In place of the lower sheet, fixed contact 20A can be formed on wiring board 20 that is made of such materials as paper/phenol substrate or glass/epoxy substrate and provided with a plurality of wiring patterns on the top and bottom faces thereof, and travelling contact 3A on upper sheet 3 can be placed opposite to the fixed contact.

Figure 12:
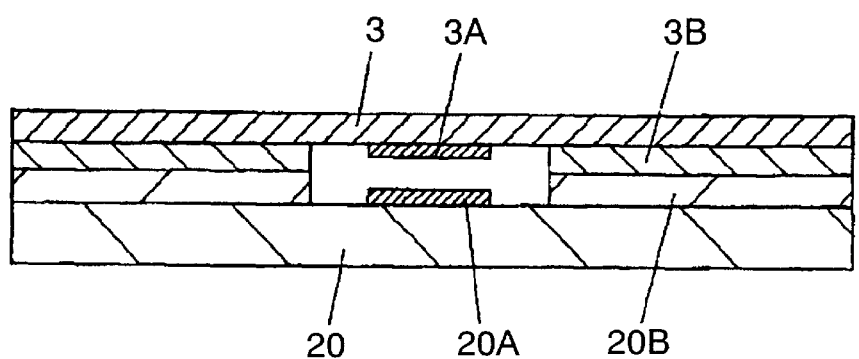
FIG. 12 is a partially sectional view of another example of the membrane switch for use in the keyboard switch.
Figure 13:
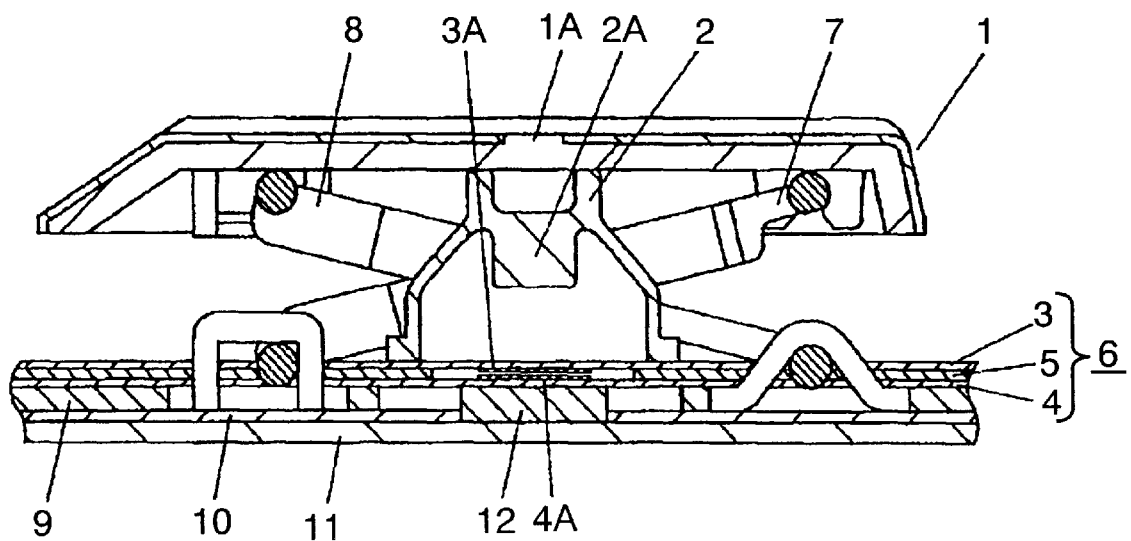
FIG. 13 is a partially sectional view of a conventional illuminated keyboard switch.
Figure 14:
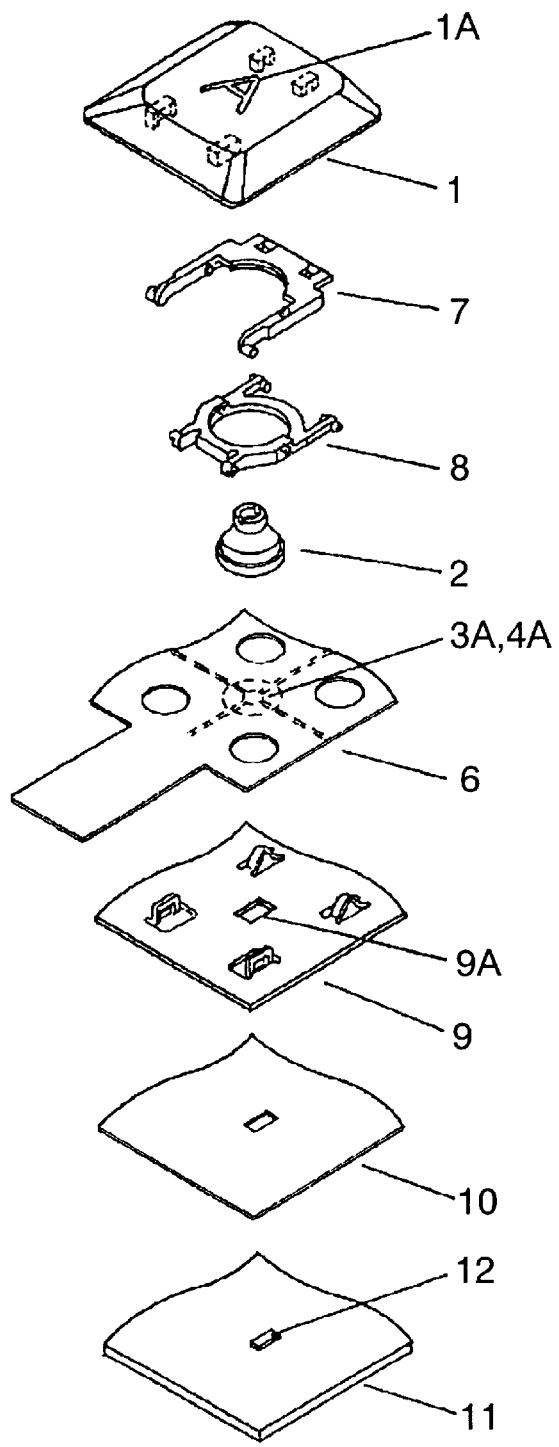
FIG. 14 is an exploded perspective view of the keyboard switch.
Figure 15:
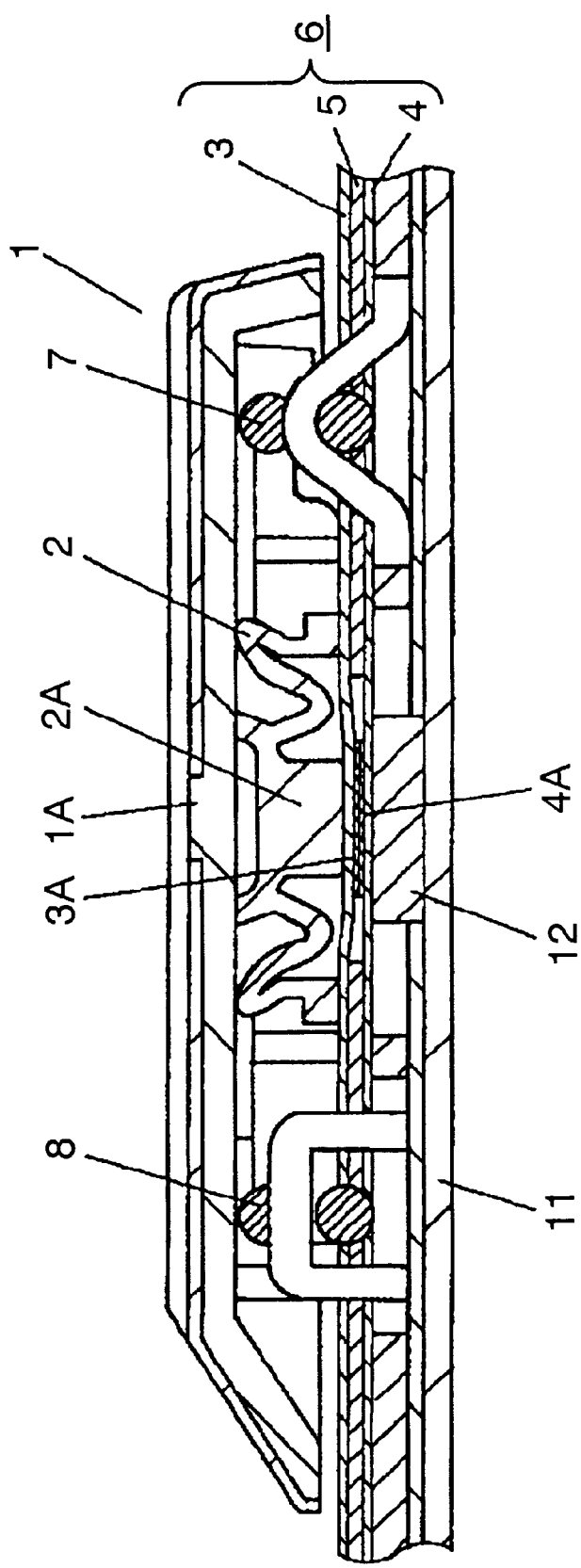
FIG. 15 is a sectional view of the keyboard switch in operation.

Furthermore, as shown in FIG. 12, the invention can be structured without spacer 5. In place of the spacer, insulating layers 3B and 20B made of such materials as epoxy resin and polyester resin can be printed on the bottom face of upper sheet 3 and the top face of wiring board 20, respectively, and melted and bonded together by heat press to form a membrane switch.

What is claimed is:

1. An illuminated keyboard switch including:
a push button having an indication part for letters, symbols, and pictures formed thereon;
a cup-shaped elastic member disposed under the push button and forcing said push button upwardly;
a light transmitting membrane switch disposed under said elastic member, said membrane switch having an upper contact and a lower contact that are brought into/out of contact with each other by pressing operation of said push button;
a baseboard disposed on a bottom face of said membrane switch, said baseboard having a plurality of through holes provided in an outer peripheral position of the contacts of said membrane switch; and an electro-luminescence (EL) element disposed on a bottom face of said baseboard, said EL element having a light transmitting electrode layer, a light-emitting layer, and a back electrode layer that are sequentially formed on a light transmitting sheet.

2. The illuminated keyboard switch as set forth in claim 1 wherein said EL element has a plurality of illumination parts.

3. The illumination keyboard switch as set forth in claim 1 wherein said plurality of illumination parts in said EL element have different illumination colors.

4. An illuminated keyboard switch including:

a push button having an indication part for letters, symbols, and pictures formed thereon;

first and second resilient frames that have top ends each engaging with a bottom face of said push button, and intermediate portions intersecting and pivotally engaging with each other in a substantially X-shape;

a base member pivotally supporting bottom ends of said first and second resilient frames;

a light transmitting membrane switch disposed under said base member, said membrane switch having an upper contact and a lower contact that are brought into/out of contact with each other by pressing operation of said push button;

a baseboard disposed on a bottom face of said membrane switch, said baseboard having a plurality of through holes provided in an outer peripheral position of the contacts of said membrane switch; and an electro-luminescence (EL) element disposed on a bottom face of said baseboard, said EL element having a light transmitting electrode layer, a light-emitting layer, and a back electrode layer that are sequentially formed on a light transmitting sheet.

* * * * *